(12) United States Patent
Harms

(10) Patent No.: US 9,599,354 B2
(45) Date of Patent: *Mar. 21, 2017

(54) EVAPORATIVE HVAC APPARATUS

(71) Applicant: Aermist LLC, Las Vegas, NV (US)

(72) Inventor: Jonathan S. Harms, Las Vegas, NV (US)

(73) Assignee: Aermist LLC, Las Vegas ( * ) Notice: Subject to any disclaimer, the term of this patent is extended or adjusted under 35 U.S.C. 154(b) by 134 days.

This patent is subject to a terminal disclaimer.

(21) Appl. No.: 14/336,715

(22) Filed: Jul. 21, 2014

(65) Prior Publication Data
US 2015/0123294 A1 May 7, 2015

Related U.S. Application Data

(63) Continuation-in-part of application No. 13/789,632, filed on Mar. 7, 2013, now Pat. No. 9,429,346.

(51) Int. Cl.
| | |
|---|---|
| *B60H 3/00* | (2006.01) |
| *F28F 1/40* | (2006.01) |
| *F24F 5/00* | (2006.01) |
| *F24F 6/04* | (2006.01) |
| *F28D 5/00* | (2006.01) |
| *F24F 1/00* | (2011.01) |

(52) U.S. Cl.
CPC ............ *F24F 5/0035* (2013.01); *F24F 6/04* (2013.01); *F28D 5/00* (2013.01); *F24F 2001/0085* (2013.01); *F25B 2339/021* (2013.01); *Y02B 30/545* (2013.01)

(58) Field of Classification Search
CPC .. F24F 5/0035; F24F 6/043; F24F 2001/0088; F24F 2001/0085; F24F 6/04; B60H 1/00378; B60H 3/00; Y02B 30/545; F25B 39/02; F28F 1/40; F28F 13/185; F28D 5/00
USPC ............ 62/304, 314, 316, 321; 261/154–155
See application file for complete search history.

(56) References Cited

U.S. PATENT DOCUMENTS

| | | | |
|---|---|---|---|
| 1,949,522 A * | 3/1934 | Williams | .............. F24F 5/0035 261/95 |
| 2,653,017 A | 9/1953 | Frost | |
| 2,802,695 A | 8/1957 | Johnson | |

(Continued)

*Primary Examiner* — Frantz Jules
*Assistant Examiner* — Martha Tadesse
(74) *Attorney, Agent, or Firm* — One3 IP Management, P.C.; Justin G. Sanders; Peter D. Weinstein

(57) ABSTRACT

An evaporative HVAC apparatus is disclosed. In at least one embodiment, the apparatus provides an at least one housing having an inner surface that defines a substantially tubular-shaped air passage extending therethrough. An absorbent wicking layer is formed immediately adjacent to at least a portion of the inner surface of the housing, and a thermal layer is formed immediately adjacent to an inner surface of the wicking layer. The housing also provides an at least one fluid inlet aperture through which a fluid line extends a distance into the housing so as to be in fluid communication with the wicking layer. Thus, a fluid is selectively delivered to the wicking layer through the fluid line which, in turn, permeates the thermal layer and evaporates into the air located immediately adjacent an exposed inner surface of the thermal layer, thereby affecting the temperature of the air moving through the air passage.

20 Claims, 4 Drawing Sheets

(56) References Cited

U.S. PATENT DOCUMENTS

| | | | | |
|---|---|---|---|---|
| 3,043,573 | A * | 7/1962 | Chandler | F24F 1/02 126/113 |
| 4,879,075 | A * | 11/1989 | Hinton | F24F 5/0035 261/103 |
| 4,935,169 | A | 6/1990 | Ernst | |
| 6,176,038 | B1 * | 1/2001 | Morlier | A47G 7/047 47/81 |
| 7,441,755 | B2 * | 10/2008 | O'Leary | A01M 1/2044 239/44 |
| 7,499,632 | B2 * | 3/2009 | Granger | A01M 1/2033 392/386 |
| 7,823,629 | B2 * | 11/2010 | Rosenfeld | F28D 15/043 165/104.26 |
| 2006/0169439 | A1 * | 8/2006 | Hong | F28D 15/046 165/104.26 |
| 2007/0163772 | A1 * | 7/2007 | Bhatti | F28F 1/126 165/202 |
| 2011/0005259 | A1 * | 1/2011 | Windham | E03B 3/28 62/285 |
| 2013/0306753 | A1 | 11/2013 | O'Leary et al. | |
| 2014/0144171 | A1 | 5/2014 | Smith et al. | |

* cited by examiner

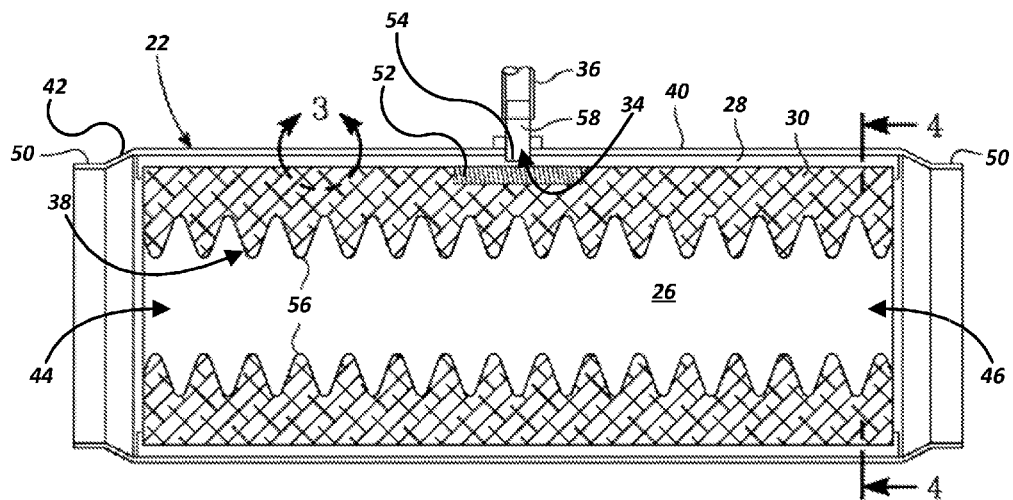
FIG. 2
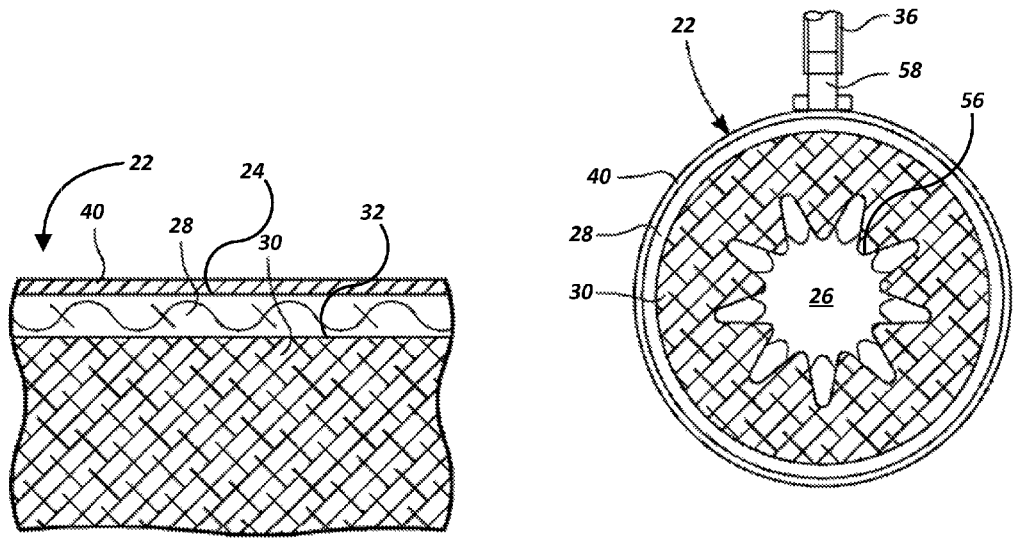
FIG. 3
FIG. 4

EVAPORATIVE HVAC APPARATUS

RELATED APPLICATIONS

This is a continuation-in-part application of a prior filed and currently pending application having Ser. No. 13/789,632 and filing date of Mar. 7, 2013.

This application claims priority and is entitled to the filing date of U.S. Non-Provisional application Ser. No. 13/789,632, filed on Mar. 7, 2013, which claims priority and is entitled to the filing date of U.S. Provisional Application Ser. No. 61/607,950, filed on Mar. 7, 2012. The contents of the aforementioned applications are incorporated by reference herein.

BACKGROUND

The subject of this patent application relates generally to heating, ventilation and air-conditioning ("HVAC"), and more particularly to an evaporative HVAC apparatus.

Applicant(s) hereby incorporate herein by reference any and all patents and published patent applications cited or referred to in this application.

By way of background, evaporative coolers operate by releasing water into the air in order to obtain an acceptable degree reduction in air temperature, dependent in part on the humidity of the outside air. Relying upon the thermodynamics associated with the conversion of water from a liquid to a gas, the majority of evaporative coolers employ a fan or blower that draws hot outside air through a wet, porous media. So long as the outside ambient air remains dry—typically below thirty percent (30%) relative humidity—such coolers can provide cooling during even the hottest days of the year at a fraction of the electrical power requirements of compressive refrigeration coolers.

Operation of an evaporative cooler has the blower drawing outside air into the housing of the cooler, typically after the air first passes through a wetted media. Water in the wetted media evaporates into the dry air as it passes through, cooling and humidifying the air in the process. The blower then exhausts the cooled air from within the housing and into the areas to be cooled, displacing the warm ambient air with the cooled, conditioned, and humidified air. Evaporative heaters operate in a similar fashion, only using heated water in the wetted media so as to warm the air that is exhausted.

Maintenance of a traditional evaporative coolers and heaters requires periodic cleansing of the water reservoir. The number of operating hours between cleanings is primarily dependent upon the operational environment of the device. Such cleanings are important to maintain the efficiency of the unit, as well as to prevent an accumulation of undesirable molds, fungus, and odors. Additionally, traditional evaporative coolers typically require large amounts of water to cool the air, which not only hinders water conservation efforts, but also adds considerable moisture in the building in which the cooler is installed. Traditional evaporative coolers are also typically only able to operate efficiently in areas where the humidity is below thirty percent (30%).

Therefore, a need exists for such an evaporative device—both cooling and heating devices—capable of operating efficiently regardless of the humidity level of the outside air, and without the requirements of having to frequently clean the device or move large volumes of air or water to achieve the desired air temperature.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an evaporative HVAC apparatus. In at least one embodiment, the apparatus provides an at least one housing having an inner surface that defines a substantially tubular-shaped air passage extending through the housing. An absorbent wicking layer is formed immediately adjacent to at least a portion of the inner surface of the housing. A thermal layer is formed immediately adjacent to an inner surface of the wicking layer, thereby sandwiching the wicking layer between the thermal layer and the inner surface of the housing. The housing also provides an at least one fluid inlet aperture through which a fluid line extends a distance into the housing so as to be in fluid communication with the wicking layer. Thus, a fluid is selectively delivered to the wicking layer through the fluid line which, in turn, permeates the thermal layer and evaporates into the air located immediately adjacent an exposed inner surface of the thermal layer, thereby affecting the temperature of the air moving through the air passage.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 2 is a cross-sectional view taken along line 2-2 of FIG. 1, in accordance with at least one embodiment;

FIG. 3 is an enlarged cross-sectional view taken of the encircled area 3 of FIG. 2, in accordance with at least one embodiment;

FIG. 4 is a cross-sectional view taken along line 4-4 of FIG. 2, in accordance with at least one embodiment;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
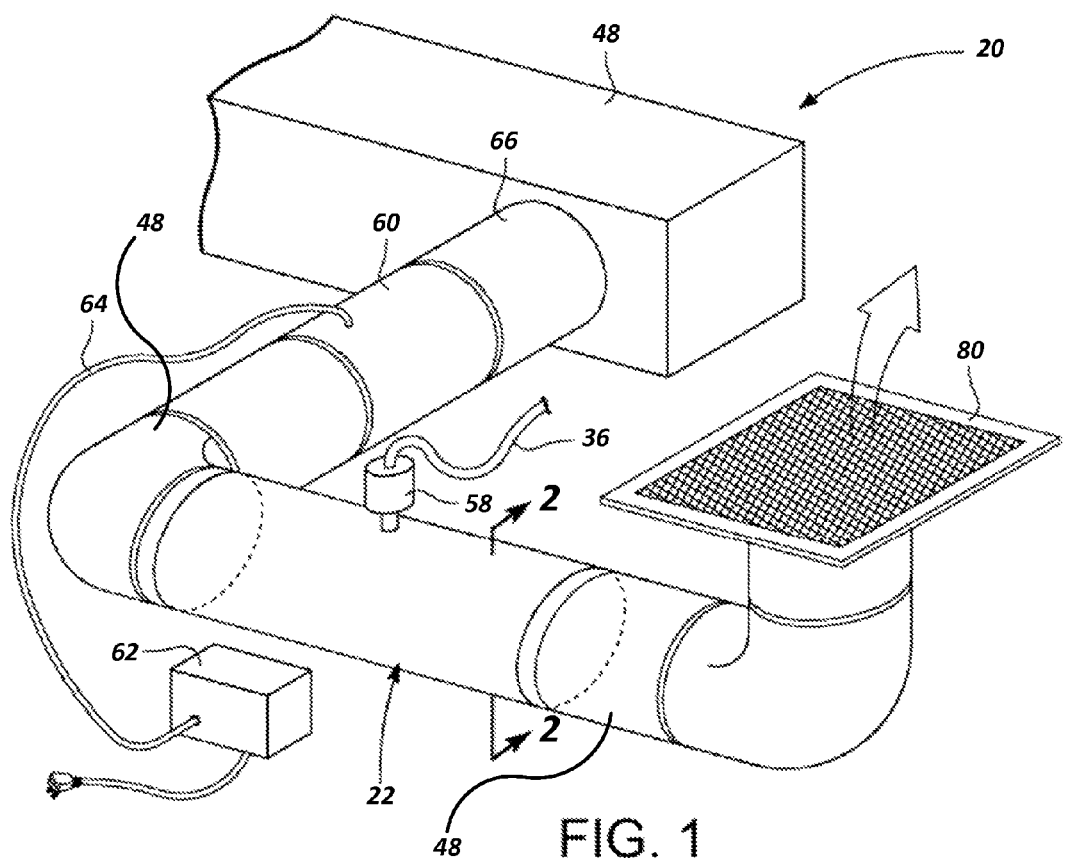
FIG. 1 is a partial perspective view of an exemplary evaporative HVAC apparatus integrated into an exemplary HVAC duct system, in accordance with at least one embodiment.

Turning now to FIG. 1, there is shown a partial perspective view of an exemplary embodiment of an evaporative HVAC apparatus 20. As shown best in FIG. 2, the apparatus 20 comprises, in the exemplary embodiment, an at least one housing 22 having an inner surface 24 that defines a substantially tubular-shaped air passage 26 extending through the housing 22. A wicking layer 28 is formed immediately adjacent to at least a portion of the inner surface 24 of the housing 22. Additionally, a thermal layer 30 is formed immediately adjacent to an inner surface 32 of the wicking layer 28, thereby sandwiching the wicking layer 28 between the thermal layer 30 and the inner surface 24 of the housing 22 (FIG. 3). Thus, as shown best in FIG. 4, because the air passage 26 is substantially tubular-shaped, the thermal layer 30, in turn, is also substantially tubular-shaped. The housing 22 further provides an at least one fluid inlet aperture 34 through which a fluid line 36 extends a distance into the housing 22 so as to be in fluid communication with the wicking layer 28. In short, and as discussed further below, in at least one embodiment, the apparatus 20 is configured for producing relatively cold or hot air by selectively delivering fluid (such as water for example) to the wicking layer 28 via the fluid line 36 which saturates the wicking layer 28 and, in turn, permeates the thermal layer 30 such that a chilling or heating of the entire thermal layer 30 (depending, in part, on the temperature of the fluid and/or the temperature of the air moving through the air passage 26) occurs as a result of the fluid within the thermal layer 30 evaporating into the air located immediately adjacent an exposed inner surface 38 of the thermal layer 30 (referred to herein as "nano-evaporation"), thereby changing the temperature of the air passing through the air passage 26. In other words, providing relatively cold fluid to the wicking layer 28 will operate to cool the thermal layer 30, such that air passing over the thermal layer 30 will also be cooled. Similarly, providing relatively hot fluid to the wicking layer 28 will operate to heat the thermal layer 30, such that air passing over the thermal layer 30 will also be heated. It should be noted that while water is the exemplary fluid utilized by the apparatus 20 in at least one embodiment, in further embodiments, any other fluid or combination of fluids, now known or later developed, may be substituted so long as the apparatus 20 is capable of substantially carrying out the functionality described herein.

Figure 5:
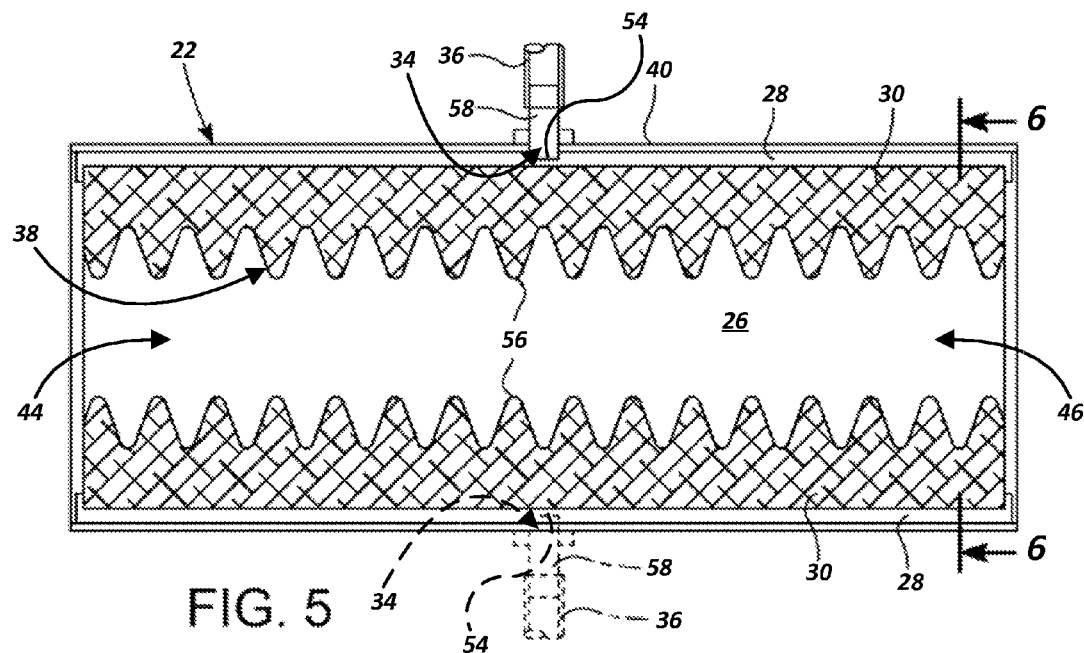
FIG. 5 is a cross-sectional view, with portions shown in phantom, of a substantially rectangular-shaped evaporative HVAC apparatus, in accordance with at least one embodiment.
Figure 6:
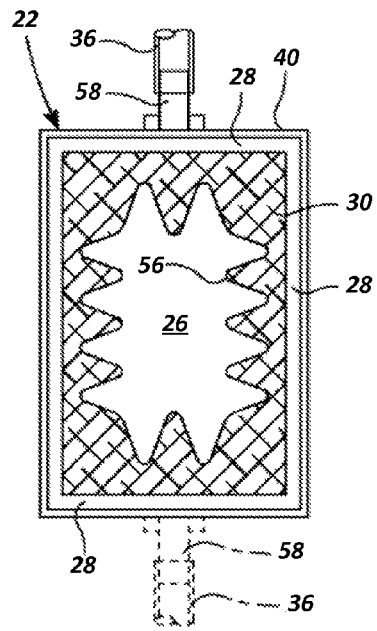
FIG. 6 is a cross-sectional view taken along line 6-6 of FIG. 5, in accordance with at least one embodiment.

In at least one embodiment, the housing 22 is constructed out of metal. However, in further embodiments, the housing 22 may be constructed out of any other material, or combination of materials, now known or later developed—such as plastic for example—so long as said materials are capable of allowing the housing 22 to substantially carry out the functionality described herein. In at least one embodiment, the housing 22 provides a substantially uniform outer surface 40, except for diameter step-downs 42 at each of a first end 44 and second end 46 of the air passage 26 where the housing 22 is to be positioned in-line with additional air ducts 48 (FIG. 1)—the step-downs 42 forming duct connector segments 50. However, in further embodiments, the housing 22 may take on any other size, shape or dimensions, now known or later conceived, dependent at least in part on the context in which the apparatus 20 is to be used. For example, in at least one such further embodiment as illustrated in FIGS. 5 and 6, the housing 22 may be substantially rectangular-shaped. Additionally, in further embodiments, the first and second ends 44 and 46 of the air passage 26 may be linearly offset from one another—i.e., the first and second ends 44 and 46 of the air passage 26 may not be in linear alignment in further embodiments. Thus, the particular sizes, shapes and dimensions shown in the accompanying drawing figures are merely exemplary and should not be read as limiting in any way.

In at least one embodiment, the wicking layer 28 is constructed out of an absorbent microfiber material capable of being saturated with fluid. However, in further embodiments, the wicking layer 28 may be constructed out of any other material, or combination of materials, now known or later developed—such as cloth, cotton, paper wadding, cellulose fiber, or superabsorbent polymers for example—so long as said materials are capable of allowing the wicking layer 28 to substantially carry out the functionality described herein. Additionally, in at least one embodiment, the wicking layer 28 is permanently affixed to the inner surface 24 of the housing 22 using an appropriate adhesive or bonding agent—dependent, in part, on the materials of which the wicking layer 28 and housing 22 are each constructed. However, in further embodiments, any other method, material, or combination of materials—now known or later developed—capable of permanently affixing the wicking layer 28 to the inner surface 24 of the housing 22 may be substituted. In still further embodiments, the wicking layer 28 is removably engaged with the inner surface 24 of the housing 22, thereby allowing the wicking layer 28 to be selectively replaced as needed. As mentioned above, the wicking layer 28 is formed immediately adjacent to at least a portion of the inner surface 24 of the housing 22. In at least one embodiment, the entire inner surface 24 of the housing 22 is covered by the wicking layer 28, which provides a wicking surface for the thermal layer 30, as discussed further below. In at least one such embodiment, shown best in FIG. 2, the wicking layer 28 is recessed proximal the first and second ends 44 and 46 of the air passage 26, immediately adjacent the duct connector segments 50, so as to minimize fluid leakage into the connecting air ducts 48.

In at least one embodiment, the thermal layer 30 is constructed of a gypsum-ceramic casting. In a bit more detail, in one such embodiment, the gypsum-ceramic casting consists of two parts gypsum to one part ceramic material formed from heated and expanded sand, providing a material of optimal weight and efficiency for casting. The resulting ceramic matrix is a lightweight castable material, providing strength as well as weight savings. This same optimal mixture ratio also provides a casting material that can sufficiently bond to the wicking layer 28. Thus, with the wicking layer 28 positioned against the inner surface 24 of the housing 22, the gypsum-ceramic casting may be formed in situ to closely conform to the inner surface 32 of the wicking layer 28 and, in turn, the inner surface 24 of the housing 22, thereby overlying the wicking layer 28. Additionally, this gypsum-ceramic casting provides an internal structure that permits a faster migration of fluid through the thermal layer 30, as well as the capability to retain more fluid when fully saturated, the importance of which is discussed further below. In further embodiments, the thermal layer 30 may be constructed out of any other material, or combination of materials, now known or later developed—such as other types of hydrophilic gypsum-based materials, terracotta, or ceramic for example—so long as said materials are capable of allowing the thermal layer 30 to substantially carry out the functionality described herein. In at least one embodiment, the thermal layer 30 includes anti-microbial material for better preventing mold, bacteria or viruses from developing. In one such embodiment, the anti-microbial material comprises zinc powder. In another such embodiment, the anti-microbial material comprises silver. In still further embodiments, the anti-microbial material may comprise any other material or combination of materials, now known or later developed, having such anti-microbial properties. In an at least one further embodiment, as shown best in FIG. 2, the thermal layer 30 provides an at least one anti-microbial plate 52—constructed of zinc metal or the like—positioned within the thermal layer 30 proximal a terminal end 54 of the at least one fluid line 36 such that the fluid passes over the anti-microbial plate 52 as it exits the fluid line 36. In at least one such embodiment, the anti-microbial plate 52 is configured for being selectively removable so as to be replaced as it erodes over time. In a still further such embodiment, where the thermal layer 30 is constructed of a gypsum-ceramic casting, the anti-microbial material is mixed into the gypsum-ceramic casting.

In at least one alternate embodiment, the thermal layer 30 is constructed of a non-permeable material having sufficient thermal conductivity. In such alternate embodiments, fluid collected by the wicking layer 28 simply contacts the thermal layer 30 and, in turn, affects the temperature of the thermal layer 30. Accordingly, the temperature of air passing through the air passage 26 and over the inner surface 38 of the thermal layer 30 is also affected—thereby providing a radiant heating or cooling rather than an evaporative heating or cooling. In other words, providing relatively cold fluid to the wicking layer 28 will operate to cool the thermal layer 30, such that air passing over the thermal layer 30 will also be cooled. Similarly, providing relatively hot fluid to the wicking layer 28 will operate to heat the thermal layer 30, such that air passing over the thermal layer 30 will also be heated. Additionally, in at least one embodiment, the thermal layer 30 is permanently affixed to the inner surface 32 of the wicking layer 28 using an appropriate adhesive or bonding agent—dependent, in part, on the materials of which the thermal layer 30 and wicking layer 28 are each constructed. However, in further embodiments, any other method, material, or combination of materials—now known or later developed—capable of permanently affixing the thermal layer 30 to the inner surface 32 of the wicking layer 28 may be substituted. In still further embodiments, the thermal layer 30 is removably engaged with the inner surface 32 of the wicking layer 28, thereby allowing the thermal layer 30 to be selectively replaced as needed.

In at least one embodiment, as illustrated best in FIGS. 2 and 4, the inner surface 32 of the wicking layer 28 is completely covered by the thermal layer 30 to ensure the formation of a dependable liquid pathway into the thermal layer 30 which forms the means for introducing sufficient liquid into the housing 22 in an appropriate manner to effectuate the efficient nano-evaporative heating or cooling of the thermal layer 30 and, in turn, the air flowing through the air passage 26. Additionally, in such an embodiment, the wicking layer 28 assists in the even application of fluid to the thermal layer 30.

It should be noted that, in at least one alternate embodiment, the thermal layer 30 may be omitted altogether such that nano-evaporation of the fluid occurs across the exposed inner surface 32 of the wicking layer 28 and affects the temperature of the air passing through the air passage 26. Furthermore, in at least one other alternate embodiment, the wicking layer 28 may be omitted altogether such that the fluid line 36 is in fluid communication with the thermal layer 30.

In at least one embodiment, the inner surface 38 of the thermal layer 30 is convoluted so as to maximize the surface area of the thermal layer 30. The greater the surface area of the thermal layer 30, over which air is able to pass, the greater effect the thermal layer 30 has on the temperature of the air passing through the air passage 26. The convoluted inner surface 38 also facilitates in the rapid tumbling of the air that passes through the air passage 26, thereby assisting to provide an even distribution of air temperature by the thermal layer 30. In one such embodiment, as illustrated best in FIG. 2, the inner surface 38 of the thermal layer 30 provides a plurality of finger-like protrusions 56 extending inwardly within the air passage 26. However, it should be noted that the particular configuration of the inner surface 38 shown in the accompanying drawing figures is merely exemplary and should not be read as limiting in any way. Accordingly, in further embodiments, the inner surface 38 may take on any other size, shape, dimensions, or configurations now known or later conceived, so long as the thermal layer 30 is capable of substantially carrying out the functionality described herein.

In at least one embodiment, it is desirable that the fluid not "flood" or over-saturate the wicking layer 28. Accordingly, in at least one such embodiment as shown best in FIGS. 1 and 2, the apparatus 20 provides a fluid injector 58 interconnected with the fluid line 36 for regulating the amount of fluid travelling to the wicking layer 28. Additionally, in at least one embodiment, a fluid reservoir (not shown) is provided as part of the fluid injector 58, with a float regulator (also not shown) utilized to obtain additional fluid from the fluid line 36 as needed to maintain a desired fluid level in the fluid reservoir and fluid injector 58. It should be noted that while the fluid injector 58 is shown in the drawings as being positioned at the terminal end 54 of the fluid line 36, proximal the housing 22, in further embodiments, the fluid injector 58 may be interconnected with the fluid line 36 at any point along the fluid line 36, so long as the apparatus 20 is capable of substantially carrying out the functionality described herein.

In at least one embodiment, the apparatus 20 further provides a timer (not shown) and a variable control valve (also not shown) interconnected with the fluid line 36. As such, in much the same manner as drip irrigation provides controlled amounts of water to plants, so too, the timer and variable control valve supply fluid to the wicking layer 28 on a measured basis over time, eliminating the requirement to maintain a standing fluid reservoir.

In at least one embodiment, as illustrated best in FIGS. 5 and 6, the housing 22 further provides more than one fluid inlet aperture 34 such that a separate fluid line 36 extends through each fluid inlet aperture 34 so as to be in fluid communication with the wicking layer 28. Accordingly, depending on the size of the housing 22 and the context in which the apparatus 20 is to be utilized, the number of fluid inlet apertures 34 and corresponding fluid lines 36 may vary in order to provide an appropriate amount of fluid to the wicking layer 28 and, in turn, the thermal layer 30. In other words, the larger the housing 22, the more fluid inlet apertures 34 and corresponding fluid lines 36 that will likely be required.

In at least one embodiment, the apparatus 20 further provides an at least one blower 60 in fluid communication with the air passage 26 and configured for moving air through the air passage 26. As such, depending at least in part on the context in which the apparatus 20 is to be utilized, the blower 60 may be positioned upstream from the air passage 26 (for pushing air through the air passage 26) or downstream from the air passage 26 (for pulling air through the air passage 26). The blower 60 may comprise any type of fan or other blowing device, now known or later developed, capable of moving a sufficient amount of air through the air passage 26. Additionally, in at least one embodiment, the apparatus 20 provides a power supply 62 and a length of electrical wiring 64 interconnecting the power supply 62 and the blower 60 for selective powering the blower 60.

In at least one embodiment, the at least one blower 60 is configured for moving a supply of ambient, unconditioned air through the air passage 26. However, in at least one further embodiment, as shown in FIG. 1, the apparatus 20 provides an at least one booster unit 66 in fluid communication with the air passage 26 of the housing 22 and configured for appropriately modifying the temperature of the air before it enters the air passage 26. Where the apparatus 20 is intended to produce relatively cold air, the at least one booster unit 66 is configured for generating relatively cold air, thereby effectively pre-cooling the air before it is moved through the air passage 26 so that the apparatus 20 may produce even colder air. In one such embodiment, the booster unit 66 is an air-conditioner. However, in further such embodiments, the booster unit 66 may comprise any other device or combination of devices, now known or later developed, capable of generating an appropriate amount of relatively cold air. Similarly, where the apparatus 20 is intended to produce relatively hot air, the at least one booster unit 66 is configured for generating relatively hot air, thereby effectively pre-heating the air before it is moved through the air passage 26 so that the apparatus 20 may produce even hotter air. In one such embodiment, the booster unit 66 is a heater. However, in further such embodiments, the booster unit 66 may comprise any other device or combination of devices, now known or later developed, capable of generating an appropriate amount of relatively hot air. Thus, in at least one embodiment, the apparatus 20 is capable of functioning as a hybrid heating or cooling system, utilizing both nano-evaporation as well as traditional air-conditioning or heating.

Thus, again, in at least one embodiment, the apparatus 20 is designed to allow an efficient amount of air into the air passage 26 where it passes over the convoluted thermal layer 30 to achieve a desired degree of air heating or cooling (depending on the context in which the apparatus 20 is utilized) in the shortest air passage 26 possible. Decreasing the size of the housing 22 (and, thus, the air passage 26) as well as minimizing the overall weight of the apparatus 20 promotes ease of installation while still achieving a desired degree of heating or cooling.

Additionally, in at least one embodiment where the apparatus 20 provides at least one booster unit 66, since the apparatus 20 in such an embodiment effectively leverages the air source of the booster unit 66, the apparatus 20 is capable of dramatically reducing the overall cost of cooling or heating in at least two ways. First, each cooling or heating cycle performed by the booster unit 66 results in a portion of the emitted cold or hot air being absorbed by the thermal layer 30 as the air moves through the air passage 26. As such, once the booster unit 66 shuts off, the apparatus 20 is able to continue producing cold or hot air for a period of time by virtue of the thermal layer 30 retaining the cold or heat so as to continue affecting the temperature of air that moves through the air passage 26. Thus, the necessary run-time of the booster unit 66 is reduced, which reduces the overall energy consumption and extends the life of the booster unit 66. Second, in at least one embodiment where the booster unit 66 provides relatively cold air, the heat sink-like thermodynamics employed by the thermal layer 30 function in such a way as to result in more cold air being emitted by the apparatus 20 than what is actually being generated by the booster unit 66. As such, in at least one embodiment, the output of the apparatus 20 can be three to four times greater than the input, for example. Thus, where the booster unit 66 is a six-amp, 110-volt air-conditioner, for example, the booster unit 66 is able to produce three to four times more chilling effect—with the assistance of the at least one housing 22—than its nominal rating would indicate. With the addition of low amperage fans, the apparatus 20 can result in energy savings as high as seventy-five percent (75%). Furthermore, unlike traditional refrigerated air-conditioning systems, the apparatus 20—in at least one embodiment that incorporates at least one booster unit 66 providing relatively cold air—is capable of using less than twenty-five percent (25%) of the energy required by traditional air-conditioning systems to produce an equivalent amount of cooling due to its "hybrid" construction. Additionally, while traditional evaporative coolers typically raise the surrounding humidity level by sixty percent (60%), the apparatus 20—in at least one embodiment—only raises the surrounding humidity level by roughly eighteen percent (18%).

Figure 7:
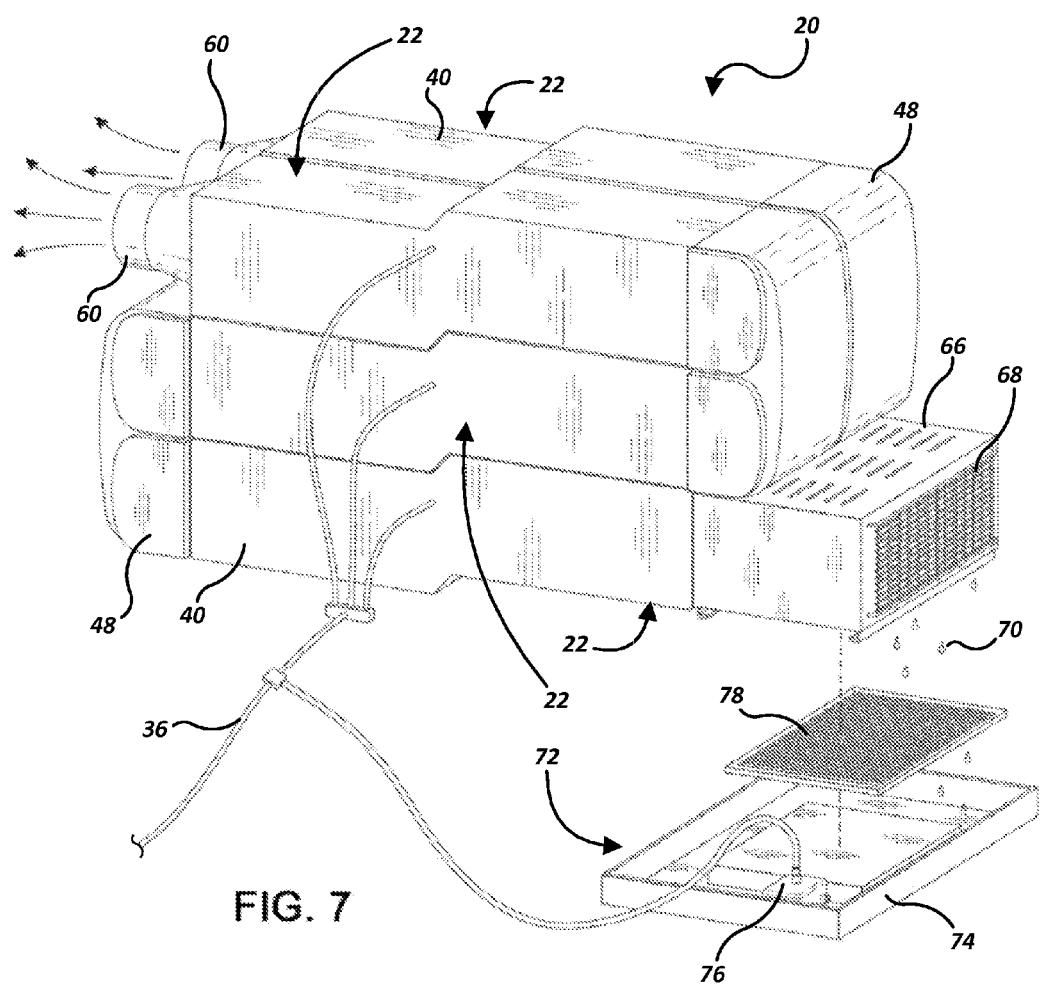
FIG. 7 is a partial exploded view of a further exemplary evaporative HVAC apparatus, in accordance with at least one embodiment.

In at least one embodiment, as shown in FIG. 7, where the apparatus 20 provides at least one booster unit 66, the booster unit 66 has an at least one coil 68 that is exposed to air such that condensation 70 is allowed to form on the coil 68. A moisture collection unit 72 is positioned substantially underneath the coil 68 for catching the condensation 70 as it drips from the coil 68. In at least one such embodiment, the moisture collection unit 72 comprises a container 74 configured for holding a volume of collected condensation 68. The moisture collection unit 72 further provides a pump 76 interconnected between the container 74 and the fluid line 36 such that the pump 76 is capable of recycling the condensation 70 by delivering it to the wicking layer 28 and, in turn, the thermal layer 30. In at least one embodiment, the moisture collection unit 72 further comprises an at least one filter 78 positioned and configured for filtering the condensation 70 before it passes into the container 74. It should be noted that while the filter 78 is shown in the drawings as being positioned between the coil 68 and the container 74, in further embodiments, the filter 78 may be positioned at any point between the coil 68 and the fluid line 36, so long as the apparatus 20 is capable of substantially carrying out the functionality described herein. Accordingly, in at least one such embodiment, the filtered condensation 70 held in the container can serve as a source of potable water. Thus, the more humid the environment in which the apparatus 20 is located, the more condensation 70 (and, in turn, potable water) that is generated and collected.

As discussed in detail below, the apparatus 20 may be utilized in a variety of contexts. In each such context, as mentioned above, depending on the operational requirements of the apparatus 20 in a given context, the apparatus 20 may incorporate multiple blowers 60, multiple booster units 66, multiple fluid lines 36, and even multiple housings 22 (and air passages 26) in fluid communication with one another.

In at least one embodiment, as illustrated in FIG. 1, the apparatus 20 is installed within an existing HVAC duct system of a building, with the housing 22 positioned proximal a room of the building to be heated or cooled. As such, the relatively hot or cold air produced by the housing 22 is discharged through an existing air register or diffuser 80. As noted above, the particular size, shape and dimensions of each of the components of the apparatus 20 are dependent in part on the context in which the apparatus 20 is to be utilized. By way of example and not limitation, in at least one embodiment where the apparatus 20 is to be installed within an existing HVAC duct system of a building, the housing 22 is ten inches in diameter and twenty-four inches in length. With the at least one blower 60 capable of producing airflow in the four hundred to seven hundred cubic feet per minute ("cfm") range, the housing 22 so dimensioned is capable of cooling (or heating) and maintaining a working space of plus-or-minus one thousand cubic feet. By way of further example and not limitation, in such an embodiment where the apparatus 20 incorporates a fluid injector 58 having a fluid reservoir, the fluid reservoir having dimensions of seven inches by four inches can provide an adequate amount of fluid for efficient operation of a housing 22 so dimensioned. By way of still further example and not limitation, in at least one embodiment, the fluid line 36 may be a low-flow water tube of the type typically used to supply water to consumer refrigerators. The resulting duct-located apparatus 20 provides a much more efficient way to regulate the temperature of a room, by further heating or cooling the incoming heated or cooled air, than is able to occur using a typical unassisted heating or air-conditioning system. In at least one further embodiment, the housing 22 (and air passage 26) may be interconnected with multiple ducts, each having a separate air register or diffuser 80 or, alternatively, each directing air through a single air register or diffuser 80.

In another embodiment, as illustrated in FIG. 7, the apparatus 20 incorporates a plurality of housings 22 (and air passages 26) in fluid communication with one another that may be arranged in parallel or in series. When the housings 22 are arranged in series with one another, the blower 60 can be positioned at an intake end and used in tandem with a direction airflow nozzle positioned at a discharge end to produce an enhanced cooling or heating outflow of air. Alternatively, when the housings 22 are arranged in parallel with one another, the apparatus 20 can provide a "bundle" of enhanced cooling or heating ducts that are capable of directing multiple streams of cooled or heated air to a desired location. In an alternate such embodiment, a single housing 22 may be large enough to provide multiple air passages 26 formed therewithin, each air passage 26 having a corresponding wicking layer 28 and thermal layer 30 as described above, with one or more of said multiple air passages 26 being in fluid communication with one another.

In yet another embodiment, the apparatus 20 may be sized for being portable or as a standalone personal heater or cooler for providing spot cooling or heating over a relatively smaller area. In such an embodiment, the apparatus 20 is relatively small and lightweight, permitting a single person to transport the apparatus 20 to where it is needed for temporary cooling or heating, or for placement in a more permanent installation. Furthermore, because such an embodiment only requires water and enough electricity to power a small fan, the apparatus 20 can easily be powered by solar- or wind-generated electricity. Such minimal requirements enable the apparatus 20 to be located off the grid, which can be very significant in third world countries where electricity distribution is limited and electricity production is erratic.

It is to be understood and appreciated that custom cooling or heating configurations might incorporate one or more of the above-described embodiments and associated components, alone or in combination, depending on the context in which the apparatus 20 is to be utilized.

As mentioned above, the apparatus 20 may be utilized in a variety of contexts. In fact, the range of contexts and applications is quite broad. For example, the apparatus 20 can be used in the typical heating and cooling applications for residential properties, commercial properties, retail properties, industrial properties, warehouses, factories, etc. Additional contexts include, but are not in any way limited to, schools, churches, clinics, hospitals, industrial shops and garages, cold storage facilities, refrigerated trucks, agricultural warehouses, animal husbandry structures, produce storage, greenhouse heating and cooling, cooling grow lamps in indoor cultivation facilities, cooling photovoltaic cells, cooling high intensity lighting, cooling wine chillers and wine cellars, make up air for commercial kitchens and laundry facilities, various military applications, temporary structures, replacements for outdoor misting systems, etc. The apparatus 20 can also be used as a replacement for conventional air-conditioning or heating systems. The apparatus 20 can also be used in a "spot cooling" or "spot heating" capacity in both indoor and outdoor environments. The apparatus 20 can also be used as a "pre-cooler" for an air-conditioner or a "pre-heater" for a heater. In such a context, since many traditional air-conditioner condensers operate at peak efficiency where the outside air temperature is ninety-five degrees Fahrenheit (95° F.) or less, the apparatus 20 is able to pre-cool the air to ensure that the air temperature is within the optimal range. Similarly, the apparatus 20 can be adaptable to a broad range of water cooling and freezer applications as a cost-effective "pre-chiller." It should be noted that the above examples are intended to be a mere subset of all possible contexts in which the apparatus 20 may be utilized and are simply being provided to illustrate the wide variety of those contexts. Ultimately, the apparatus 20 may be utilized in virtually any context where heated or cooled air is desired.

Aspects of the present specification may also be described as follows:

1. An evaporative HVAC apparatus comprising: an at least one housing having an inner surface that defines a substantially tubular-shaped air passage extending through the housing; an absorbent wicking layer formed immediately adjacent to at least a portion of the inner surface of the housing; a thermal layer formed immediately adjacent to an inner surface of the wicking layer, thereby sandwiching the wicking layer between the thermal layer and the inner surface of the housing; and the housing providing an at least one fluid inlet aperture through which a fluid line extends a distance into the housing so as to be in fluid communication with the wicking layer; whereby, a fluid is selectively delivered to the wicking layer through the fluid line which, in turn, permeates the thermal layer and evaporates into the air located immediately adjacent an exposed inner surface of the thermal layer, thereby affecting the temperature of the air moving through the air passage.

2. The evaporative HVAC apparatus according to embodiment 1, wherein a first end of the air passage is linearly offset from a second end of the air passage.

3. The evaporative HVAC apparatus according to embodiments 1-2, wherein the wicking layer is constructed out of an absorbent microfiber material capable of being saturated with fluid.

4. The evaporative HVAC apparatus according to embodiments 1-3, wherein the wicking layer is permanently affixed to the inner surface of the housing.

5. The evaporative HVAC apparatus according to embodiments 1-4, wherein the wicking layer is removably engaged with the inner surface of the housing, thereby allowing the wicking layer to be selectively replaced as needed.

6. The evaporative HVAC apparatus according to embodiments 1-5, wherein the entire inner surface of the housing is covered by the wicking layer, which provides a wicking surface for the thermal layer.

7. The evaporative HVAC apparatus according to embodiments 1-6, wherein the thermal layer is constructed of a gypsum-ceramic casting.

8. The evaporative HVAC apparatus according to embodiments 1-7, wherein the gypsum-ceramic casting consists of two parts gypsum to one part ceramic material formed from heated and expanded sand.

9. The evaporative HVAC apparatus according to embodiments 1-8, wherein with the wicking layer positioned against the inner surface of the housing, the gypsum-ceramic casting is formed in situ to closely conform to the inner surface of the wicking layer and, in turn, the inner surface of the housing, thereby overlying the wicking layer.

10. The evaporative HVAC apparatus according to embodiments 1-9, wherein the thermal layer includes anti-microbial material for better preventing mold, bacteria or viruses from developing.

11. The evaporative HVAC apparatus according to embodiments 1-10, wherein the anti-microbial material comprises an at least one anti-microbial plate, constructed of zinc metal, positioned within the thermal layer proximal a terminal end of the at least one fluid line, such that the fluid passes over the anti-microbial plate as it exits the fluid line.

12. The evaporative HVAC apparatus according to embodiments 1-11, wherein the at least one anti-microbial plate is removably positioned within the thermal layer.

13. The evaporative HVAC apparatus according to embodiments 1-12, wherein the thermal layer is permanently affixed to the inner surface of the wicking layer.

14. The evaporative HVAC apparatus according to embodiments 1-13, wherein the thermal layer is removably engaged with the inner surface of the wicking layer, thereby allowing the thermal layer to be selectively replaced as needed.

15. The evaporative HVAC apparatus according to embodiments 1-14, wherein the inner surface of the thermal layer is convoluted so as to maximize the surface area of the thermal layer.

16. The evaporative HVAC apparatus according to embodiments 1-15, wherein the inner surface of the thermal layer provides a plurality of finger-like protrusions extending inwardly within the air passage.

17. The evaporative HVAC apparatus according to embodiments 1-16, further comprising a fluid injector interconnected with the fluid line for regulating the amount of fluid travelling to the wicking layer.

18. The evaporative HVAC apparatus according to embodiments 1-17, further comprising an at least one blower in fluid communication with the air passage and configured for moving air through the air passage.

19. The evaporative HVAC apparatus according to embodiments 1-18, further comprising an at least one booster unit in fluid communication with the air passage of the housing and configured for appropriately modifying the temperature of the air before it enters the air passage.

20. The evaporative HVAC apparatus according to embodiments 1-19, wherein: the booster unit has an at least one coil that is exposed to air such that condensation is allowed to form on the coil; and a moisture collection unit is positioned substantially underneath the coil for catching the condensation as it drips from the coil, the moisture collection unit comprising: a container configured for holding a volume of collected condensation; and a pump interconnected between the container and the fluid line such that the pump is capable of recycling the condensation by delivering it to the wicking layer and, in turn, the thermal layer.

21. The evaporative HVAC apparatus according to embodiments 1-20, wherein the moisture collection unit further comprises an at least one filter positioned and configured for filtering the condensation before it passes into the container, whereby the filtered condensation held in the container can serve as a source of potable water.

22. The evaporative HVAC apparatus according to embodiments 1-21, wherein the at least one housing is configured for being installed within an existing HVAC duct system of a building.

23. The evaporative HVAC apparatus according to embodiments 1-22, further comprising a plurality of housings, the air passages of said housings in fluid communication with one another.

24. An evaporative HVAC apparatus comprising: an at least one housing having an inner surface that defines a substantially tubular-shaped air passage extending through the housing; an absorbent wicking layer formed immediately adjacent to at least a portion of the inner surface of the housing; a thermal layer formed immediately adjacent to an inner surface of the wicking layer, thereby sandwiching the wicking layer between the thermal layer and the inner surface of the housing; the housing providing an at least one fluid inlet aperture through which a fluid line extends a distance into the housing so as to be in fluid communication with the wicking layer; and an at least one booster unit in fluid communication with the air passage of the housing and configured for appropriately modifying the temperature of the air before it enters the air passage; whereby, a fluid is selectively delivered to the wicking layer through the fluid line which, in turn, permeates the thermal layer and evaporates into the air located immediately adjacent an exposed inner surface of the thermal layer, thereby affecting the temperature of the air moving through the air passage.

25. An evaporative HVAC apparatus comprising: an at least one housing having an inner surface that defines a substantially tubular-shaped air passage extending through the housing; an absorbent wicking layer formed immediately adjacent to at least a portion of the inner surface of the housing; a thermal layer formed immediately adjacent to an inner surface of the wicking layer, thereby sandwiching the wicking layer between the thermal layer and the inner surface of the housing; the housing providing an at least one fluid inlet aperture through which a fluid line extends a distance into the housing so as to be in fluid communication with the wicking layer; an at least one booster unit in fluid communication with the air passage of the housing and configured for appropriately modifying the temperature of the air before it enters the air passage, the booster unit having an at least one coil that is exposed to air such that condensation is allowed to form on the coil; and a moisture collection unit positioned substantially underneath the coil for catching the condensation as it drips from the coil, the moisture collection unit comprising: a container configured for holding a volume of collected condensation; and a pump interconnected between the container and the fluid line such that the pump is capable of recycling the condensation by delivering it to the wicking layer and, in turn, the thermal layer; whereby, a fluid is selectively delivered to the wicking layer through the fluid line which, in turn, permeates the thermal layer and evaporates into the air located immediately adjacent an exposed inner surface of the thermal layer, thereby affecting the temperature of the air moving through the air passage.

In closing, regarding the exemplary embodiments of the present invention as shown and described herein, it will be appreciated that an evaporative HVAC apparatus is disclosed. Because the principles of the invention may be practiced in a number of configurations beyond those shown and described, it is to be understood that the invention is not in any way limited by the exemplary embodiments, but is generally directed to an evaporative HVAC apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An evaporative HVAC apparatus comprising:
   an at least one housing having an inner surface that defines an air passage extending through the housing;
   an absorbent wicking layer formed immediately adjacent and directly attached to at least a portion of the inner surface of the housing;
   a thermal layer formed immediately adjacent and directly attached to an inner surface of the wicking layer, thereby sandwiching the wicking layer between the thermal layer and the inner surface of the housing, an exposed inner surface of the thermal layer defining a substantially tubular-shaped air passage extending through the thermal layer in fluid communication with the air passage of the housing; and
   the housing providing an at least one fluid inlet aperture through which a fluid line extends a distance into the housing so as to be in fluid communication with the wicking layer;
   whereby, a fluid is selectively delivered to the wicking layer through the fluid line which, in turn, permeates the thermal layer and evaporates into the air located immediately adjacent the exposed inner surface of the thermal layer, thereby affecting the temperature of the air moving through the air passage of the thermal layer.

2. The evaporative HVAC apparatus of claim 1, wherein a first end of the air passage is linearly offset from a second end of the air passage.

3. The evaporative HVAC apparatus of claim 1, wherein the wicking layer is constructed out of an absorbent microfiber material capable of being saturated with fluid.

4. The evaporative HVAC apparatus of claim 1, wherein the entire inner surface of the housing is covered by the wicking layer, which provides a wicking surface for the thermal layer.

5. The evaporative HVAC apparatus of claim 1, wherein the thermal layer is constructed of a gypsum-ceramic casting.

6. The evaporative HVAC apparatus of claim 5, wherein the gypsum-ceramic casting consists of two parts gypsum to one part ceramic material formed from heated and expanded sand.

7. The evaporative HVAC apparatus of claim 6, wherein with the wicking layer positioned against the inner surface of the housing, the gypsum-ceramic casting is formed in situ to closely conform to the inner surface of the wicking layer and, in turn, the inner surface of the housing, thereby overlying the wicking layer.

8. The evaporative HVAC apparatus of claim 1, wherein the thermal layer includes anti-microbial material for better preventing mold, bacteria or viruses from developing.

9. The evaporative HVAC apparatus of claim 8, wherein the anti-microbial material comprises an at least one anti-microbial plate, constructed of zinc metal, positioned within the thermal layer proximal a terminal end of the at least one fluid line, such that the fluid passes over the anti-microbial plate as it exits the fluid line.

10. The evaporative HVAC apparatus of claim 1, wherein the inner surface of the thermal layer is convoluted so as to maximize the surface area of the thermal layer.

11. The evaporative HVAC apparatus of claim 10, wherein the inner surface of the thermal layer provides a plurality of finger-like protrusions extending inwardly within the air passage of the thermal layer.

12. The evaporative HVAC apparatus of claim 1, further comprising a fluid injector interconnected with the fluid line for regulating the amount of fluid travelling to the wicking layer.

13. The evaporative HVAC apparatus of claim 1, further comprising an at least one blower in fluid communication with the air passage of the housing and configured for moving air through the air passage.

14. The evaporative HVAC apparatus of claim 1, further comprising an at least one booster unit in fluid communication with the air passage of the housing and configured for appropriately modifying the temperature of the air before said air enters the air passage.

15. The evaporative HVAC apparatus of claim 14, wherein:
the booster unit has an at least one coil that is exposed to air such that condensation is allowed to form on the coil; and
a moisture collection unit is positioned substantially underneath the coil for catching the condensation as said condensation drips from the coil, the moisture collection unit comprising:
a container configured for holding a volume of collected condensation; and
a pump interconnected between the container and the fluid line such that the pump is capable of recycling the condensation by delivering said condensation to the wicking layer and, in turn, the thermal layer.

16. The evaporative HVAC apparatus of claim 15, wherein the moisture collection unit further comprises an at least one filter positioned and configured for filtering the condensation before said condensation passes into the container, whereby the filtered condensation held in the container can serve as a source of potable water.

17. The evaporative HVAC apparatus of claim 1, wherein the at least one housing is configured for being installed within an existing HVAC duct system of a building.

18. The evaporative HVAC apparatus of claim 1, further comprising a plurality of housings, the air passages of said housings in fluid communication with one another.

19. An evaporative HVAC apparatus comprising:
an at least one housing having an inner surface that defines an air passage extending through the housing;
an absorbent wicking layer formed immediately adjacent and directly attached to at least a portion of the inner surface of the housing;
a thermal layer formed immediately adjacent and directly attached to an inner surface of the wicking layer, thereby sandwiching the wicking layer between the thermal layer and the inner surface of the housing, an exposed inner surface of the thermal layer defining a substantially tubular-shaped air passage extending through the thermal layer in fluid communication with the air passage of the housing; and
the housing providing an at least one fluid inlet aperture through which a fluid line extends a distance into the housing so as to be in fluid communication with the wicking layer; and
an at least one booster unit in fluid communication with the air passage of the housing and configured for appropriately modifying the temperature of the air before said air enters the air passage;
whereby, a fluid is selectively delivered to the wicking layer through the fluid line which, in turn, permeates the thermal layer and evaporates into the air located immediately adjacent the exposed inner surface of the thermal layer, thereby affecting the temperature of the air moving through the air passage of the thermal layer.

20. An evaporative HVAC apparatus comprising:
an at least one housing having an inner surface that defines an air passage extending through the housing;
an absorbent wicking layer formed immediately adjacent and directly attached to at least a portion of the inner surface of the housing;
a thermal layer formed immediately adjacent and directly attached to an inner surface of the wicking layer, thereby sandwiching the wicking layer between the thermal layer and the inner surface of the housing, an exposed inner surface of the thermal layer defining a substantially tubular-shaped air passage extending through the thermal layer in fluid communication with the air passage of the housing; and
the housing providing an at least one fluid inlet aperture through which a fluid line extends a distance into the housing so as to be in fluid communication with the wicking layer;
an at least one booster unit in fluid communication with the air passage of the housing and configured for appropriately modifying the temperature of the air before said air enters the air passage, the booster unit having an at least one coil that is exposed to air such that condensation is allowed to form on the coil; and
a moisture collection unit positioned substantially underneath the coil for catching the condensation as said condensation drips from the coil, the moisture collection unit comprising:
a container configured for holding a volume of collected condensation; and
a pump interconnected between the container and the fluid line such that the pump is capable of recycling the condensation by delivering said condensation to the wicking layer and, in turn, the thermal layer;
whereby, a fluid is selectively delivered to the wicking layer through the fluid line which, in turn, permeates the thermal layer and evaporates into the air located immediately adjacent the exposed inner surface of the thermal layer, thereby affecting the temperature of the air moving through the air passage of the thermal layer.

* * * * *